United States Patent [19]

Wood et al.

[11] Patent Number: 5,007,711

[45] Date of Patent: Apr. 16, 1991

[54] COMPACT ARRANGEMENT FOR HEAD-UP DISPLAY COMPONENTS

[75] Inventors: Robert S. Wood, Hillsboro; Mark A. Thomas, Lake Oswego, both of Oreg.

[73] Assignee: Flight Dynamics, Inc., Portland, Oreg.

[21] Appl. No.: 278,198

[22] Filed: Nov. 30, 1988

[51] Int. Cl.$^5$ .................. G02B 5/32; G02B 27/14; G03H 1/30

[52] U.S. Cl. .................................... 350/174; 350/3.7

[58] Field of Search .................. 350/3.7, 174, 3.72

[56] References Cited

U.S. PATENT DOCUMENTS

| | | | |
|---|---|---|---|
| 3,940,204 | 2/1976 | Withrington | 350/35 |
| 4,261,647 | 3/1981 | Ellis | 350/174 |
| 4,407,564 | 10/1983 | Ellis | 350/174 |
| 4,582,389 | 4/1986 | Wood et al. | 350/3.69 |
| 4,652,870 | 3/1987 | Steward | 350/174 X |
| 4,669,810 | 8/1987 | Wood | 350/3.7 |
| 4,688,879 | 8/1987 | Fairchild | 350/3.7 |
| 4,714,320 | 12/1987 | Banbury | 350/174 |
| 4,763,990 | 8/1988 | Wood | 350/3.7 X |

OTHER PUBLICATIONS

Rev. Sci. Instrum. 51(6) Jun. 1980, pp. 809–813 S. Anada Rao and S.V. Poppu, "Holographic Methods for the Fabrication of Various Types of Mirrors", publication by D. W. Swift, Diffractive Optics for Avionic Display. Publication by J. R. Banbury entitled "Wide Field of View Head-Up Display" (11 pages) 1982.

Kaiser Electronics publication entitled "The Advantages of Holographic Combiners in Standard Huds" (2 pages).

Primary Examiner—Bruce Y. Arnold
Assistant Examiner—David R. Parsons
Attorney, Agent, or Firm—Stoel Rives Boley Jones & Grey

[57] ABSTRACT

An arrangement for head-up display system components incorporated into an aircraft cockpit forward of the ejection plane (124) provides space for accommodating a head-down display device (132) immediately beneath the over-nose vision surface (128) and adjacent to the ejection plane (124). The arrangement of components minimizes the amount of angular change in the pilot's line of sight that is required when the pilot moves his head to change his view from the outside real world scene to the head-down display device.

19 Claims, 1 Drawing Sheet

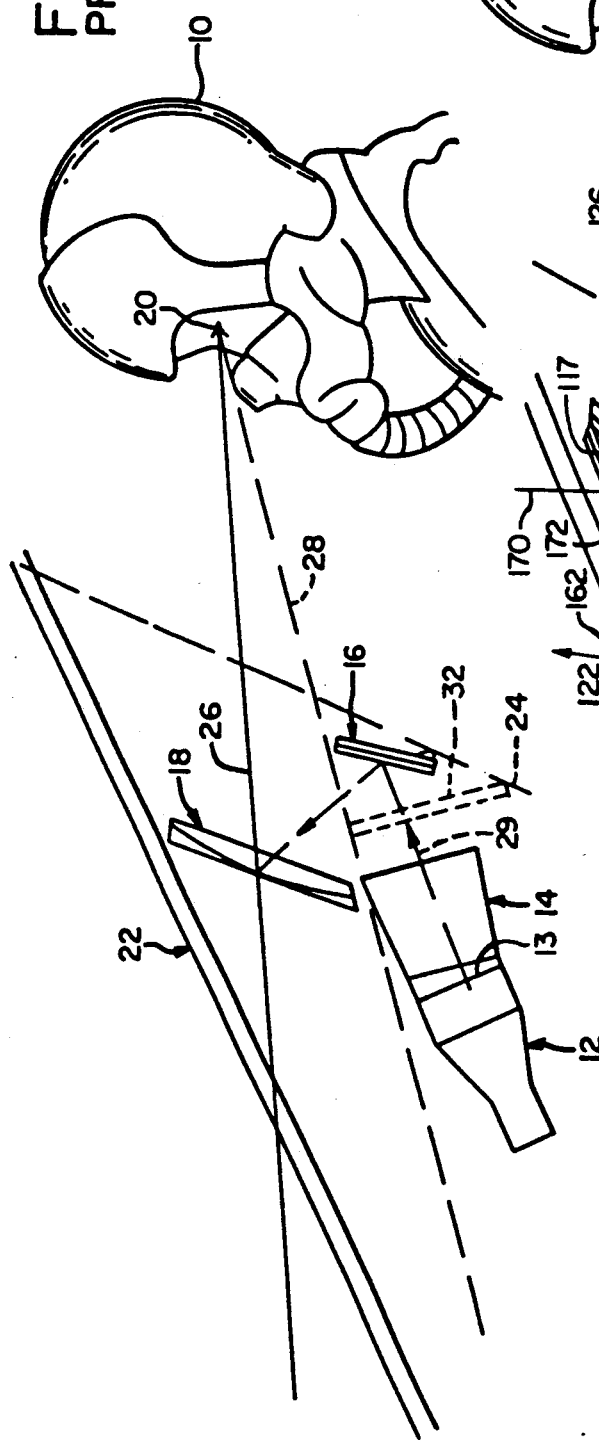
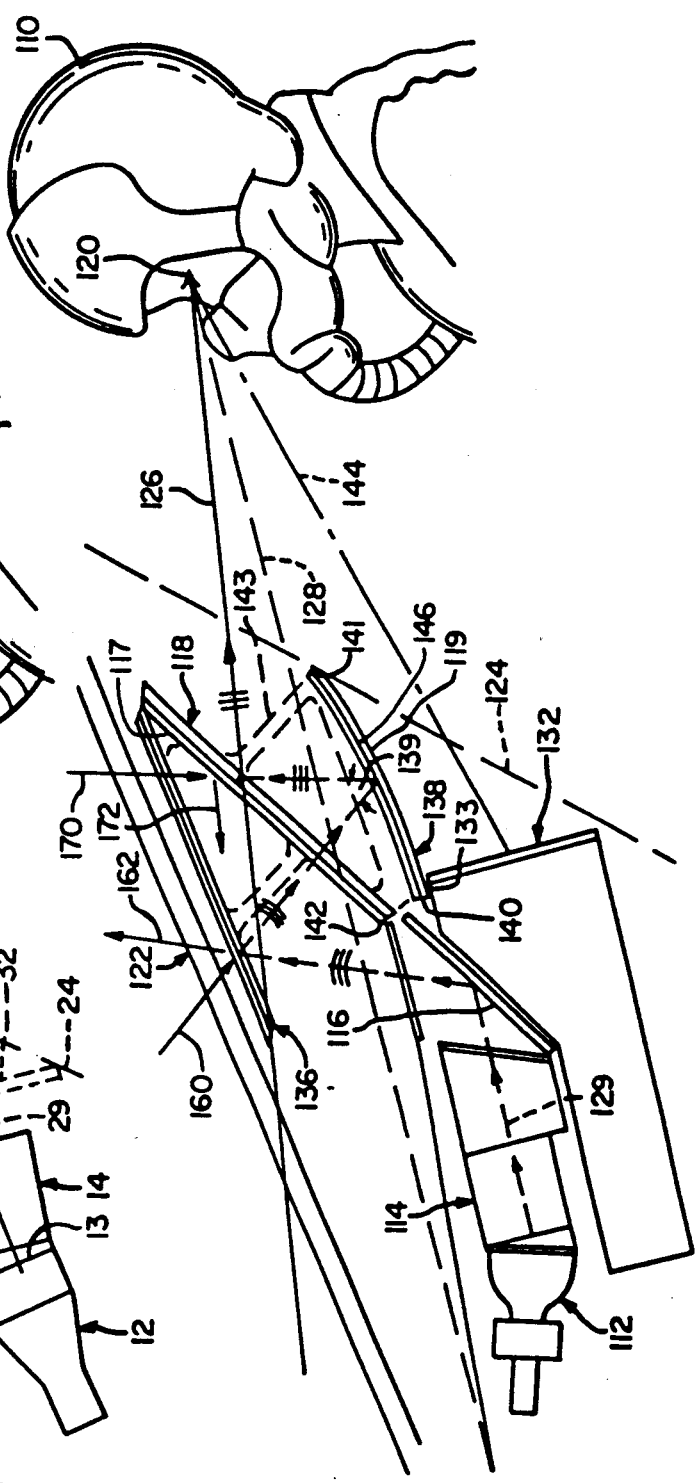

COMPACT ARRANGEMENT FOR HEAD-UP DISPLAY COMPONENTS

BACKGROUND OF THE INVENTION

The present invention relates to a head-up display system and, in particular, to a compact arrangement of the system components within an aircraft cockpit.

TECHNICAL FIELD

An aircraft head-up display (HUD) system is used to display flight information in a manner that permits the pilot to simultaneously observe that information and the real world scene outside the aircraft. An important component of the system is known as a combiner. The combiner is positioned forward of the pilot and extends partly across the pilot's view of the real world scene. The combiner is constructed to permit light from the real world scene to pass through it while reflecting flight information-carrying light that is projected onto it.

The flight information light emanates from a source such as a cathode-ray tube (CRT). HUDs that provide a wide field-of-view include a multi-element relay lens that is usually positioned adjacent to the CRT screen. The relay lens re-images the flight information light from the CRT to an intermediate image position approximately one focal length from the combiner. The combiner is shaped so that the light rays propagating from the CRT and incident upon the combiner are collimated and reflected to the pilot. As a result, CRT-generated flight information focused at optical infinity is presented to the pilot. Accordingly, the pilot can simultaneously view the outside world scene and the flight information without changing eye focus. In some HUDs, the display collimation is provided by a separate collimating lens assembly that is incorporated between the CRT and the combiner.

It is known that a particularly effective combiner can be constructed using a hologram or a holographic optical element. For instance, the combiner may be formed with a hologram having holographic fringe planes constructed to efficiently diffract a narrow band of wavelengths. The flight information-carrying light generated from a CRT is within this band of wavelengths. The light is projected onto the combiner, which is oriented to diffract the light to the pilot. Apart from the narrow reflected band, the entire spectral band of the real world scene passes through the combiner. A combiner comprising a holographic optical element has narrow band reflection characteristics and may incorporate diffractive power for correcting aberrations in the incident light rays.

The diffractive power of a holographic optical element results from constructing the hologram with fringe planes intersecting the surfaces of the hologram. Fringe planes so oriented, however, create flare or multiple images that the pilot sees when he views bright objects (e.g., runway lights) through the combiner. The flare problem is distracting to the pilot. The flare problem can be eliminated if the combiner is formed with fringe planes parallel to or conformal with the substrate surface. Such a combiner, however, has no aberration correction capability.

Head-up display systems incorporating holographic components are described in U.S. Pat. No. 4,582,389, entitled "Holographic Device", and U.S. Pat. No. 4,669,810, entitled "Head-Up Display System". The subject matter of these patents is herein incorporated by reference.

When a head-up display system is employed in a tactical fighter or other aircraft having relatively limited cockpit space, it is necessary to position the components of the system in a compact and unobstructive arrangement. In such an aircraft, space is provided in the cockpit to permit ejection of the pilot in emergency situations. The forward boundary of the ejection space is defined by an imaginary ejection plane that extends through the cockpit forward of the pilot and slopes rearwardly from bottom to top. None of the head-up display system components can extend rearwardly through the ejection plane into the ejection space.

Typically, the CRT and associated relay lens are positioned forward of the ejection plane and beneath the over-nose vision surface. The over-nose vision surface is the top surface of the cockpit instrument panel and defines the lower boundary of the pilot's field of view of the outside real world scene. The CRT and the relay lens are most compactly arranged beneath the over-nose vision surface when the CRT screen is facing rearwardly. That is, light emanates from the CRT into the relay lens in a direction generally toward the pilot. The optic axis of the propagating light is folded upwardly and forwardly to the combiner by a reflecting fold mirror that is positioned between the pilot and the relay lens just forward of the ejection plane.

Arranging the CRT and fold mirror as just described creates a relatively large angle between the light rays incident on the combiner and the light rays diffracted to the pilot from the combiner. This off-axis angle introduces substantial image aberrations. The larger the off-axis angle, the more severe the image aberrations. The off-axis angle may be decreased by moving the combiner forward in the cockpit; however, such movement reduces the pilot's vertical instantaneous field of view of the display.

A HUD having a wide field of view and a large off-axis angle requires, therefore, image aberration correction of some type. In U.S. Pat. No. 4,669,810, correction is accomplished by use of a fold mirror that is a holographic optical element having built-in image aberration correction.

In certain fighter aircraft cockpits, it is preferred to employ a head-down display device in combination with a head-up display system. A head-down display device is located beneath the pilot's field of view of the outside real world scene. Accordingly, the pilot must glance downwardly to observe information on such a display.

It is desirable to minimize the distance between the information displayed on the combiner and the information displayed on the head-down display, thereby minimizing the amount of angular change in the pilot's direct line of sight that is required when the pilot glances downwardly to view the head-down display information. Consequently, the head-down display device should be located immediately beneath the over-nose vision surface. Further, placing the head-down display device very near the ejection plane minimizes the amount of cockpit space required to provide an unobstructed view of the device. Placing the head-down display immediately beneath the over-nose vision surface and very near the ejection plane is incompatible with current head-up display systems because, as noted, this location is typically occupied by system components such as the CRT, relay lens, and fold mirror.

SUMMARY OF THE INVENTION

This invention is directed to an arrangement for head-up display system components incorporated into an aircraft cockpit forward of the ejection plane to provide space for accommodating a head-down display device positioned immediately beneath the over-nose vision surface and adjacent to the ejection plane.

The system of the present invention generally comprises a combiner located forward of the pilot and extending across the pilot's direct line of sight when the pilot views the outside real world scene. The combiner is substantially transparent to all but a preselected narrow bandwidth of light that strikes the combiner within a preselected range of angles of incidence. Also included is a flight information-carrying light source mounted within the cockpit beneath the over-nose vision surface at a location forward of, and spaced away from, the ejection plane. The wavelengths of source light lie within the narrow bandwidth diffracted by the combiner at the angle of incidence to the combiner.

A lower fold mirror located beneath the over-nose vision surface near the source and spaced away from the ejection plane reflects the source light emanating from the source toward a wavelength selective upper fold mirror mounted within the cockpit forward of the combiner and above the over-nose vision surface. The upper fold mirror is transparent to all light except the preselected narrow bandwidth of light that strikes the upper fold mirror within the preselected range of angles of incidence. The upper fold mirror diffracts the source light, which strikes the forward side of the combiner at a first angle of incidence that is outside of the predetermined range of angles of incidence. A collimator mounted beneath the aircraft over-nose vision surface collimates the source light diffracted by the upper fold mirror and transmitted through the combiner. The collimator diffracts the collimated source light so that it strikes the rearward side of the combiner at a second angle of incidence that is within the predetermined range of angles of incidence for diffraction. The source light diffracted by the combiner propagates toward the pilot.

The arrangement of components in accordance with this invention permits the placement of a head-down display device at a location immediately beneath the over-nose vision surface and very near the ejection plane, thereby minimizing the required amount of angular change in the pilot's direct line of sight when the pilot glances downwardly to view the head-down display information.

As noted, the source light is transmitted through the combiner, diffracted by the collimator, and then diffracted by the combiner toward the pilot. Preferably, the combiner is of the holographic type. The hologram is tuned to diffract only the wavelengths of incident source light that are within the predetermined range of angles of incidence. It can be appreciated that as the angle of incidence of light that is transmitted through the combiner approaches the angle of incidence of light that is diffracted by the combiner, more precision is required in fabricating and tuning the hologram to ensure complete transmission of the former light and complete diffraction of the latter light.

According to another aspect of this invention, the difference between the angle of incidence of light transmitted through the combiner and the angle of incidence of light diffracted by the combiner is large, thereby reducing the cost and complexity of constructing the combiner by reducing the precision required in fabricating and tuning the hologram.

As yet another aspect of this invention, the collimator is preferably of the holographic type formed with image aberration correction capability. Specifically, the collimator is formed with diffractive power adequate to correct aberrations in the source light. As a result, it is possible to form the combiner as having no diffractive power. Such a combiner would be, therefore, free of flare in transmission.

BRIEF DESCRIPTION OF THE DRAWINGS

FIG. 1 is a schematic representation of a prior art arrangement of head-up display system components.

FIG. 2 is a schematic representation of a preferred arrangement of head-up display system components according to the present invention.

DETAILED DESCRIPTION OF A PREFERRED EMBODIMENT

Referring to FIG. 1, depicted is a head-up display system which, for the purposes of this description, is representative of a prior art arrangement of the system components. This component arrangement is shown, for example, in U.S. Pat. No. 3,940,204, entitled "Optical Display Systems Utilizing Holographic Lenses" and U.S. Pat. No. 4,669,810, entitled "Head Up Display System." The system is located forward of the pilot 10. Generally, the components include a light source, such as a CRT 12, that provides a luminous display of flight information, and a multi-element relay lens 14 that forms an intermediate image of the display near a fold mirror 16, the intermediate image being approximately one focal length from a combiner 18. The intermediate image is reflected toward the combiner 18 by the fold mirror 16.

The combiner 18 extends across the pilot's direct line of sight 26 when the pilot views the outside real world scene. As is known in the art, the combiner 18 diffracts the light propagating along an optic axis 29 from the fold mirror 16 to the pilot's eyes 20 while permitting the pilot to view the real world scene through the aircraft canopy 22.

The head-up display system components 12, 14, 16, and 18 are all located forward of an imaginary ejection plane 24 that extends in front of the pilot 10 across the cockpit and slopes rearwardly from bottom to top. The region rearward of the ejection plane 24 remains unobstructed to permit safe ejection of the pilot.

The CRT 12 and relay lens 14 are positioned beneath an over-nose vision surface 28, which is the lower limit of the pilot's field of view of the outside real world scene. The most compact orientation for the CRT 12 is with the CRT display screen 13 facing generally rearwardly. The relay lens 14 is located near the CRT display screen 13. The fold mirror 16 is positioned slightly forward of the ejection plane and reflects light upwardly and forwardly to the combiner 18.

As noted earlier, in certain aircraft it is preferred that a head-down display device be located so that the display appears immediately beneath the over-nose vision surface 28. Further, the head-down display device should be located near the ejection plane 24 to maximize the angular size of the display, and should be tilted to minimize the angle between the pilot's direct view and the surface normal to the display device. The preferred location of the head-down display device 32 is shown in dotted lines in FIG. 1. As shown, the preferred location of the head-down display device is incompatible with the location of the conventionally arranged head-up display components, in particular the fold mirror 16.

FIG. 2 depicts the preferred arrangement of head-up display system components in accordance with this invention. The components are arranged in a fighter aircraft cockpit having essentially the same geometry as that shown in FIG. 1. Specifically, the components of the system are located beneath the forward portion of a transparent canopy 122, forward of the pilot 110. An ejection plane 124 extends in front of the pilot across the cockpit and slopes rearwardly from bottom to top. The region rearward of the ejection plane 124 remains unobstructed to permit safe ejection of the pilot. The pilot's direct line of sight 126 passes through the canopy 122 when the pilot views the outside real world scene. The lower limit of the pilot's field of view of the outside real world scene is defined by an over-nose vision surface 128.

The component arrangement of the present invention includes a conventional CRT flight information light source 112 and associated relay lens 114 positioned beneath the over-nose vision surface 128 and spaced away from the ejection plane 124. The CRT emits source light having a characteristic peak wavelength of 544 nm. The source light propagates along an optic axis 129.

A flat lower fold mirror 116 of conventional design is located near the relay lens 114 below the over-nose vision surface 128. The lower fold mirror 116 is located away from the ejection plane 124 a distance adequate to accommodate a collimator element 138 positioned between the mirror 116 and the ejection plane 124. The collimator 138 is described more fully below.

The fold mirror 116 reflects the source light that emanates from the CRT 112 and that passes through the relay lens 114. The mirror 116 directs the source light upwardly to an upper fold mirror 136 mounted within the cockpit within the pilot's field of view of the outside real world scene. The fold mirror 136 is of wavelength selective character and preferably includes a hologram formed by known means to diffract the bandwidth of the source light when the light strikes the upper fold mirror 136 at an angle of incidence lying within a preselected range of angles of incidence. (As used herein, "angle of incidence" is the angle formed by a ray arriving at a surface and the normal to that surface at the point of arrival.) That is, during the hologram exposure and processing, the Bragg wavelength condition and Bragg angle are set to diffract the source light when it strikes the upper fold mirror 136 at an angle of incidence of approximately 33°±5°. Wavelengths of light outside of the selected spectral bandwidth or incidence angles (i.e., the remaining spectral band of the light emanating from the outside real world scene) pass substantially unaltered through the upper fold mirror 136 for viewing by the pilot.

A combiner 118 is positioned within the cockpit slightly rearward of and beneath the upper fold mirror 136. Combiner 118 is of wavelength selective character and preferably includes a hologram formed by known means to diffract the spectral bandwidth of the source light when it strikes the combiner at an angle lying within a preselected range of angles of incidence. In the preferred embodiment, combiner 118 is constructed to diffract source light incident thereupon within a preselected range of angles of incidence of between 40° and 60°. The combiner 118 is oriented so that source light diffracted by the upper fold mirror 136 is incident upon the forward side 117 of the combiner 118 at an angle of incidence between 0° and 15°. For convenience, this angle of incidence will be referred to as the first angle of incidence. Since the first angle of incidence is outside of the preselected range of angles of incidence, light diffracted by the fold mirror 136 propagates through the combiner 118.

After passing through the combiner 118, the source light strikes the surface of a collimator 138, which is located below the over-nose vision surface 128 with its forwardmost end 140 near the lower end 142 of the combiner 118. The rearwardmost end 141 of the collimator is located adjacent to the ejection plane 124, just below the over-nose vision surface 128. The collimator is of wavelength selective character and is preferably of the holographic type formed by means known in the art. Specifically, the collimator 138 is a holographic optical element enclosed between two glass substrates and configured to diffract the source light that propagates along optic axis 129, diffracts off of the upper fold mirror 136, and propagates through the combiner 118. Any source light not diffracted by the collimator 138 is absorbed by a light-absorbing coating applied to the lowermost surface 119 of the collimator 138.

Substantially all of the source light diffracts off the collimator 138 and strikes the combiner 118 at an angle of incidence of approximately 50°. For convenience, this angle of incidence will be referred to as the second angle of incidence. The second angle of incidence lies within the 40° to 60° range of angles of incidence. As a result, the light diffracted by the collimator 138 to the combiner 118 will in turn be diffracted by the combiner to the eyes 120 of the pilot 110.

The collimator 146 is configured so that the holographic surface 120 collimates the source light. The source light that diffracts off the combiner 118 forms an image of flight information focused at optical infinity. Such an image and the outside real world scene can be viewed simultaneously by the pilot without changing eye focus. Alternatively, the flight information could be focused at any desired image distance.

As described, the orientation of the collimator 138 is such that it is out of the pilot's real world field of view. As a result, the collimator 138 can be constructed so that the holographic optical element has fringe planes that provide diffractive power suitable for correcting aberrations introduced by the off-axis angle 139 at the collimator. The combiner 118 is a simple holographic optical element enclosed between two flat glass substrates. Use of a conformal hologram combiner (i.e., a hologram having a substantially low spatial frequency of fringe plane intersections with the surface of glass substrate supporting the hologram) avoids the flare problem mentioned earlier. The techniques for constructing such a hologram are fully described in U.S. Pat. No. 4,582,389.

The various optical components of the head-up display system, i.e., the CRT 112, relay lens 114, lower fold mirror 116, upper fold mirror 136, combiner 118 and collimator 138, are secured in precise position as just described by a suitable support structure 143 shown in dotted lines in FIG. 2. The support structure is readily fabricated by one of ordinary skill in the art.

As noted earlier, the display system optical components are arranged in accordance with this invention so that the source light diffracted by the upper fold mirror 136 passes through the combiner 118 at a first angle of incidence of between 0° and 15° with respect to the surface normal. Further, source light diffracted by the collimator 138 strikes the combiner 118 at a second angle of incidence of approximately 50°. Accordingly, the component arrangement provides a relatively large difference between the first and second angles of incidence of at least approximately 35°. Consequently, the transmission efficiency of the source light through combiner 118, and the reflection efficiency of the source light from combiner 118 after diffracting from collimator 138 are simultaneously maximized.

It can be appreciated that if the second angle of incidence were 40° (i.e., at the low end of the preselected range of angles of incidence), the difference between the first and second angles would be at least 25°. By way of comparison, it is noted that if the difference between the first and second angles of incidence is relatively low (e.g., fewer than 20°), the spectral characteristics of the holographic combiner 118 must be manufactured and "fine tuned" with relatively high precision to transmit the light striking the combiner at the first angle of incidence while diffracting the light striking the combiner at the second angle of incidence. Imprecise tuning of the spectral characteristics of such holographic combiners causes attenuation of the light transmitted through, or reduction of the diffraction efficiency of, the holographic combiner.

As shown in the FIG. 2, the top 133 of a head-down display device 132 is located beneath the collimator 138. In the preferred embodiment, the collimator is arranged such that its major surfaces are approximately parallel to the over-nose vision surface 128 so that the pilot 10 can see below the collimator 138 to view the top of the display device 132. Further, the pilot must divert his line of sight only approximately 10° beneath the over-nose vision surface 128 to view the top of the display device 132. For a conventional head-down display device having a 40 cm by 17 cm screen mounted to a 42 cm by 20 cm front panel, the pilot can view the center of the display (along line 144 in FIG. 2) by diverting his line of sight by only approximately 14° below the over-nose vision surface 128.

As shown, the head-down display device 132 can be mounted very near the ejection plane 124, thereby maximizing the angular size of the head-down display. As noted earlier, if the display device 132 were placed farther forward of the ejection plane 124, the angular size of the head-down display would be reduced, and a greater volume of cockpit space would be needed between the ejection plane 124 and the device.

It is noteworthy that the described preferred arrangement of HUD components cooperate advantageously to prevent display image contrast reduction. The contrast reduction could be caused by sunlight passing through the canopy 122. In this regard, it is noted that sunlight passing through the canopy 122 and along propagation paths (such as shown at 160 and 170) that are aligned with any portions of the HUD system optic axis 129 will tend to travel along the system optic axis 129. It is important to note, however, that the sunlight must first pass through either the wavelength selective upper fold mirror 136 or the wavelength selective combiner 118, before propagating along the system optic axis 129. As a result, the spectral components of sunlight corresponding to the light source bandwidth will be diffracted outwardly from the system optic axis 129 (such as shown by arrows 162 and 172) by the upper fold mirror 136 or combiner 118. As a consequence, any portion of sunlight that reaches the collimator 138 and is diffracted back to the combiner 118 will be lacking the spectral component that would otherwise be directed by the combiner into the pilot's eyes to reduce display contrast.

While a preferred embodiment of the present invention has been described and illustrated, various modifications will be apparent to those skilled in the art. For example, it is contemplated that a conventional prism could be used in lieu of the lower fold mirror 116. The invention is intended to include all such modifications within the scope of the appended claims.

We claim:

1. An arrangement for head-up display system components within the cockpit of an aircraft, wherein the cockpit includes a canopy through which the pilot observes the outside real world scene, an over-nose vision surface beneath which the pilot cannot view the outside real world scene, and an imaginary ejection plane extending across the cockpit forward of the pilot, the arrangement comprising:

wavelength selective combiner means located forward of the pilot and mounted to extend across the pilot's line of sight when the pilot views the outside real world scene, for reflectively diffracting wavelengths of incident light lying within a preselected bandwidth and striking the combiner means within a preselected range of angles of incidence and for transmitting other wavelengths of incident light;

source means mounted within the cockpit beneath the over-nose vision surface forward of and spaced away from the ejection plane for projecting information-carrying source light of wavelengths lying within the preselected bandwidth;

upper mirror means of wavelength selective character mounted within the cockpit above the over-nose vision surface, forward of the combiner means, and across the pilot's line of sight through part of the combiner means for reflectively diffracting the source light emanating from the source means to strike the combiner means at a first angle of incidence to the combiner means, the first angle of incidence lying outside the preselected range of angles of incidence; and collimator means mounted below the over-nose vision surface for collimating the source light reflectively diffracted by the upper mirror means and for directing the collimated source light to the combiner means at a second angle of incidence to the combiner means, the second angle of incidence lying within the preselected range of angles of incidence.

2. The arrangement of claim 1 wherein the source means further comprises lower mirror means mounted within the cockpit beneath the over-nose vision surface and forward of the ejection plane for reflecting toward the upper mirror means the source light emanating from the source means.

3. The arrangement of claim 1 wherein the collimator means is of the holographic type.

4. The arrangement of claim 1 wherein the upper mirror means is of the holographic type.

5. The arrangement of claim 1 wherein the combiner means is of the holographic type.

6. The arrangement of claim 5 wherein the combiner means includes a conformal hologram.

7. The arrangement of claim 6 wherein the collimator means includes diffraction power means for correcting image aberrations.

8. The arrangement of claim 3 wherein the collimator means is of the holographic type.

9. The arrangement of claim 1 wherein the collimator means includes diffraction power means for correcting image aberrations.

10. The arrangement of claim 9 wherein the collimator means is of the holographic type.

11. The arrangement of claim 1 wherein the source means and the collimator means are arranged to define a space beneath the collimator means and immediately forward of the ejection plane so that a portion of the space can be viewed when the pilot alters his direct line of sight by no more than 10° beneath the over-nose vision surface.

12. The arrangement of claim 1 wherein the difference between the upper angle of incidence and the first angle of incidence is at least about 25°.

13. The arrangement of claim 1 wherein the upper mirror means includes a hologram constructed to diffract source light incident thereon within an angular range of about 25° to 35°.

14. An arrangement for head-up display system components within the cockpit of an aircraft, wherein the cockpit includes a canopy through which the pilot observes the outside real world scene, an over-nose vision surface beneath which the pilot cannot view the outside real world scene, and an imaginary ejection plane extending across the cockpit forward of the pilot, the arrangement comprising:

wavelength selective combiner means located forward of the pilot and mounted to extend across the pilot's direct line of sight when the pilot views the outside real world scene, for reflectively diffracting wavelengths of incident light lying within a preselected bandwidth and striking the combiner means within a preselected range of angles of incidence and for transmitting other wavelengths of incident light;

source means mounted within the cockpit beneath the over-nose vision surface forward of an spaced away from the ejection plane for projecting information-carrying source light of wavelengths lying within the preselected bandwidth;

upper mirror means of wavelength selective character mounted within the cockpit above the over-nose vision surface and forward of the combiner means for reflectively diffracting the source light emanating from the source means to strike the combiner means at a first angle of incidence to the combiner means, the first angle of incidence lying outside the preselected range of angles of incidence; and collimator means for collimating the source light reflectively diffracted by the upper mirror means and for directing the collimated source light to the combiner means at a second angle of incidence to the combiner means, the second angle of incidence lying within the preselected range of angles of incidence; the wavelength selective combiner means and the upper mirror means being positioned along a system optic axis relative to the canopy so that substantially all incident light propagating through the canopy in approximate alignment with the system optic axis strikes first either the upper mirror means or the wavelength selective combiner means.

15. The arrangement of claim 14 wherein the collimator means is mounted beneath the over-nose vision surface.

16. The arrangement of claim 14 wherein the source means further comprises lower mirror means mounted within the cockpit beneath the over-nose vision surface and forward of the ejection plane for reflecting toward the upper mirror means the source light emanating from the source means.

17. The arrangement of claim 14 wherein the combiner means is of the holographic type.

18. The arrangement of claim 14 wherein the collimator means is of the holographic type.

19. The arrangement of claim 14 wherein the upper mirror means is of the holographic type.

* * * * *

UNITED STATES PATENT AND TRADEMARK OFFICE
CERTIFICATE OF CORRECTION

PATENT NO. : 5,007,711

DATED : April 16, 1991

INVENTOR(S) : Robert S. Wood and Mark A. Thomas

It is certified that error appears in the above-identified patent and that said Letters Patent is hereby corrected as shown below:

Column 6, line 38, change "collimator 146" to --collimator 138--.

Column 6, line 39, change "surface 120" to --surface 146--.

Column 7, line 15, change "138" to --138,--.

Column 7, line 36, change "pilot 10" to --pilot 110--.

Column 7, line 55, change "the described" to --in the described--.

Column 7, line 56, change "of" to --, the--.

Claim 12, column 9, line 21, change "upper angle" to --second angle--.

UNITED STATES PATENT AND TRADEMARK OFFICE
CERTIFICATE OF CORRECTION

PATENT NO. : 5,007,711
DATED     : April 16, 1991
INVENTOR(S) : Robert S. Wood, et al.

It is certified that error appears in the above-identified patent and that said Letters Patent is hereby corrected as shown below:

In the abstract, line 8, change "line of sight" to --direct line of sight--.

Signed and Sealed this

Twenty-ninth Day of September, 1992

Attest:

DOUGLAS B. COMER

*Attesting Officer*    *Acting Commissioner of Patents and Trademarks*